United States Patent
Thiele et al.

(10) Patent No.: US 8,814,989 B2
(45) Date of Patent: Aug. 26, 2014

(54) PROCESS FOR REMOVING CARBON DIOXIDE ($CO_2$) FROM A CYCLE GAS SYSTEM

(75) Inventors: Robin Thiele, Speyer (DE); Gerhard Theis, Maxdorf (DE)

(73) Assignee: BASF SE (DE)

( * ) Notice: Subject to any disclaimer, the term of this patent is extended or adjusted under 35 U.S.C. 154(b) by 119 days.

(21) Appl. No.: 13/109,945

(22) Filed: May 17, 2011

(65) Prior Publication Data

US 2011/0283885 A1 Nov. 24, 2011

Related U.S. Application Data

(60) Provisional application No. 61/345,602, filed on May 18, 2010.

(51) Int. Cl.
*B01D 53/14* (2006.01)

(52) U.S. Cl.
CPC .. *B01D 53/1475* (2013.01); *B01D 2252/20447* (2013.01); *B01D 2252/2041* (2013.01); *B01D 2252/103* (2013.01); *Y02C 10/06* (2013.01); *B01D 2252/504* (2013.01); *B01D 2252/20489* (2013.01)
USPC .............. 95/199; 96/236; 96/223; 96/227; 423/228; 423/229; 423/220; 585/652

(58) Field of Classification Search
USPC ............ 423/220, 228, 229; 95/179, 180, 183, 95/187, 199, 223, 227–229, 236
See application file for complete search history.

(56) References Cited

U.S. PATENT DOCUMENTS

| | | | |
|---|---|---|---|
| 2,135,271 A * | 11/1938 | Balcar | 568/867 |
| 3,137,654 A | 6/1964 | Johnson et al. | |
| 3,523,957 A * | 8/1970 | Tsao | 549/538 |
| 3,867,113 A | 2/1975 | Foster et al. | |
| 3,907,969 A | 9/1975 | Field | |
| 4,769,047 A * | 9/1988 | Dye | 95/97 |
| 6,436,174 B1 * | 8/2002 | Grossmann et al. | 95/191 |
| 8,500,868 B2 * | 8/2013 | Adams et al. | 95/247 |

(Continued)

FOREIGN PATENT DOCUMENTS

| | | |
|---|---|---|
| DE | 23 44 499 A | 3/1974 |
| DE | 25 51 717 | 6/1977 |

(Continued)

OTHER PUBLICATIONS

International Search Report—PCT/EP2011/057815 and English translation—Aug. 8, 2011.

*Primary Examiner* — Duane Smith
*Assistant Examiner* — Cabrena Holecek
(74) *Attorney, Agent, or Firm* — Drinker Biddle & Reath LLP

(57) ABSTRACT

A process for removing carbon dioxide ($CO_2$) by means of an absorption medium from a cycle gas system, wherein the $CO_2$ occurs within a process in which, in the gas phase, ethylene is oxidized by oxygen ($O_2$) to ethylene oxide (EO) in the presence of a catalyst, in which, as by product, $CO_2$ is generated, by using as absorption medium an aqueous solution of one or more amines, wherein, for further purification of the cycle gas stream obtained downstream of the $CO_2$ absorption step, this cycle gas stream is brought into intimate contact with water to which no mineral acid and no higher glycol was added.

15 Claims, 6 Drawing Sheets

(56) References Cited

U.S. PATENT DOCUMENTS

| | | | |
|---|---|---|---|
| 2003/0060644 A1* | 3/2003 | Barnicki et al. | 549/541 |
| 2004/0092774 A1* | 5/2004 | Mimura et al. | 564/497 |
| 2009/0156875 A1* | 6/2009 | Tomioka et al. | 585/802 |
| 2010/0029962 A1* | 2/2010 | Szul et al. | 549/541 |
| 2010/0226841 A1 | 9/2010 | Thiele et al. | |
| 2011/0094381 A1 | 4/2011 | Lichtfers et al. | |
| 2011/0118487 A1 | 5/2011 | Abdallah et al. | |
| 2011/0135549 A1 | 6/2011 | Lichtfers et al. | |
| 2011/0308389 A1* | 12/2011 | Graff et al. | 95/166 |
| 2012/0294785 A1* | 11/2012 | Murai et al. | 423/210 |

FOREIGN PATENT DOCUMENTS

| | | |
|---|---|---|
| DE | 32 36 600 | 4/1984 |
| DE | 198 28 977 | 12/1999 |
| DE | 100 36 173 | 2/2002 |
| GB | 1415036 | 11/1975 |
| WO | WO 01/98285 A1 | 12/2001 |
| WO | WO 03/022826 A1 | 3/2003 |
| WO | WO 03/082844 A1 | 10/2003 |
| WO | WO 2010/086449 | 8/2010 |
| WO | WO 2010/133461 | 11/2010 |
| WO | WO 2010/142714 | 12/2010 |

* cited by examiner

PROCESS FOR REMOVING CARBON DIOXIDE ($CO_2$) FROM A CYCLE GAS SYSTEM

CROSS-REFERENCE TO RELATED APPLICATIONS

This application claims the benefit of U.S. Provisional Application No. 61/345,602 filed May 18, 2010, the entire contents of which are incorporated herein by reference in its entirety.

FIELD OF THE INVENTION

The invention relates to a process for removing carbon dioxide ($CO_2$) by means of a solvent mixture from a cycle gas system, wherein the $CO_2$ occurs within a process in which a chemical reaction is carried out in the gas phase in the presence of a catalyst, in which chemical reaction $CO_2$ is generated as by product.

BACKGROUND

U.S. Pat. No. 3,523,957 A (The Lummus Comp., "Process for Producing an Olefinic Oxide") relates generally to a process for producing olefin oxides.

DE 23 44 499 A (The Benfield Corp., "Waschlösung für saure Gase und ihre Verwendung" [Scrubbing solution for acid gases and use thereof]) and U.S. Pat. No. 3,907,969 A (The Benfield Corp., "Separation of $CO_2$ from Gas Mixtures") describe, as solvent for the $CO_2$ absorption, a potash solution which is activated by inorganic salts.

The EP patent application having the application number 09159104.0 of Apr. 29, 2009 (BASF SE) relates to absorption media for removing acid gases from a fluid stream comprising an aqueous solution of cyclic amine compounds.

WO 03/022826 A1 (Scientific Design Comp., Inc.; "Heat Recovery Procedure") describes a method for heat recovery in the discharge of $CO_2$ in ethylene oxide production. In a special scrubbing column, the cycle gas is first heated, then passed to the potash $CO_2$ absorber and thereafter the gas is cooled again (figure on page 9 of the WO publication). As heat carrier medium, water is used which is heated in the afterscrubber and gives off its heat again in the prescrubber. Advantages mentioned are the reduction of glycol formation in the potash $CO_2$ absorber by reduction of ethylene oxide in the supplied cycle gas. In addition, the afterscrubber leads to the removal of water which is necessary for the reaction procedure, since water, according to the teaching of the patent application, is disadvantageous to the catalyst. Further advantages mentioned are the low pressure drop compared with thermal integration via heat exchangers.

Disadvantages: the special apparatus into which both scrubbers are integrated is very complex.

WO 03/082844 A1 (BASF AG, "Verfahren zur Herstellung von Ethylen oxid mit integrierter Kohlendioxidwäsche" [Process for producing ethylene oxide having integrated carbon dioxide scrubbing]) teaches a process for producing ethylene oxide from ethylene and $O_2$ in which $CO_2$ is ejected using an aqueous amine solution which comprises a tertiary alkanolamine and optionally an aliphatic secondary amine.

The patent application, for operating the $CO_2$ removal, describes preferably a solvent which essentially comprises only the tertiary alkanolamine, in particular N-methyldiethanolamine (MDEA) and an aliphatic secondary amine, in particular PIP. According to the teaching of the patent application, the gas stream leaving the $CO_2$ absorber can be brought into contact with an aqueous solution of a mineral acid or a higher glycol (page 6, 2nd paragraph).

Disadvantages: the glycol solutions or mineral acid solutions must subsequently be regenerated in a complex manner in order to remove the condensed water. The regeneration leads to an increased expenditure in terms of apparatus and increases the operating costs of the process. When the glycol solution is treated, in addition to the water, in addition, amines which are still dissolved must be removed in order to avoid accumulation. The amines have good solubility in glycol solutions. The amines which are commonly used in gas scrubbing in addition have a higher boiling temperature than water, and so the glycol solution must be distilled at high temperature or in a vacuum, which greatly increases the expenditure in terms of apparatus and the operating costs. Since in addition, amines can be formed by degradation which have a higher boiling temperature than the glycol solution, the distillation must be carried out in two separate apparatuses.

Furthermore, owing to the glycols, a new substance is introduced into the process which is associated with increased costs.

WO 01/98285 A1 (Eastman Chem. Comp., "Process for the removal of carbon dioxide from 3,4-epoxy-1-butene process recycle streams") describes in particular for the production of 3,4-epoxy-1-butene (EpB) from butadiene and $O_2$ a process for removing $CO_2$ using an aqueous or alcoholic alkanolamine solution, wherein the alkanolamines are primary and/or secondary alkanolamines each having up to ten carbon atoms and having a respective boiling temperature of below 250° C. (page 15, line 27 to page 16, line 1).

Traces of amines (15 vol.-ppm) are described as being able to damage reversibly the silver-based catalyst (page 19, lines 25-27). In particular, the content of amines in the gas downstream of the $CO_2$ scrubber must be reduced to less than 10 vol.-ppm, preferably 5 vol.-ppm, and particularly preferably 1 vol.-ppm. As a possibility for removing amines, a scrubbing column is mentioned. As scrubbing solvent, water is preferred (page 20).

A difference from the ethylene oxide production process is the fact that degradation products which form in the amine solution in the production of EpB are relatively long-chained, since butenols are concerned, whereas in the production of ethylene oxide, shorter-chain ethanols form. Therefore, other degradation products form and tertiary amines are not used in the absorption medium, therefore the gas phase which forms is also a different one. Application of the results from an EpB production process to an EO production process, in particular also with respect to the scrubbing action of a water scrubber, is therefore not possible.

SUMMARY OF THE INVENTION

The object of the present invention was to provide an improved economic process for removing $CO_2$, overcoming disadvantages of the prior art, for a process having a cycle gas system in which EO is produced from ethylene in the gas phase in the presence of a catalyst, in which process $CO_2$ is generated as by product.

The process should in addition be particularly simple and economic.

According to the invention it has been found that in the removal of $CO_2$ using amine solutions in ethylene oxide production, with respect to an advantageous lowering of traces of amine remaining in the cycle gas to a concentration which in particular is not harmful for the activity of the EO catalyst, the composition of the agent for further purification of the cycle gas obtained downstream of the $CO_2$ absorption step is of particular importance.

Accordingly a process has been found for removing carbon dioxide ($CO_2$) by means of an absorption medium from a cycle gas system, wherein the $CO_2$ occurs within a process in which, in the gas phase, ethylene is oxidized by oxygen ($O_2$) to ethylene oxide (EO) in the presence of a catalyst, in which, as by product, $CO_2$ is generated, which comprises using as absorption medium an aqueous solution of one or more amines, wherein, for further purification of the cycle gas stream obtained downstream of the $CO_2$ absorption step, this cycle gas stream is brought into intimate contact with water to which no mineral acid and no higher glycol was added.

DETAILED DESCRIPTION OF THE PREFERRED

Figure 1:
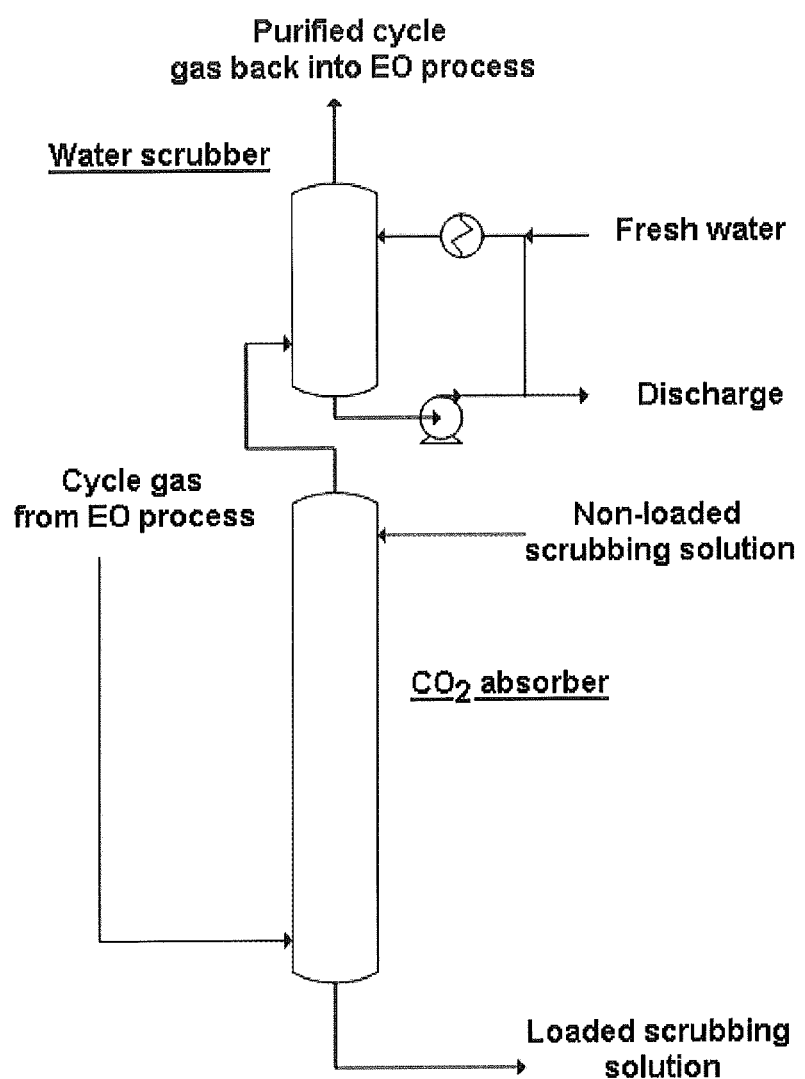
FIG. 1 is a schematic diagram of an embodiment of the process in which the scrubbing column is integrated into the $CO_2$-absorber.

Examples of a mineral acid would be sulfuric acid or phosphoric acid, and also compounds which liberate a mineral acid in water.

Examples of a higher glycol would be those which are derived from EO and have 2 to 6 EO repeating units, particularly di- or triethylene glycol (cf. WO 03/082844 A1, page 6, 3rd paragraph) and also compounds which liberate a higher glycol in water.

Preferably, for further purification of the cycle gas stream obtained downstream of the $CO_2$ absorption step, this cycle gas stream is brought into intimate contact with water to which no acid and no glycol (e.g. monoethylene glycol (EG), di- or triethylene glycol) has been added. "Acid" and "glycol" too comprise compounds which liberate an acid or a glycol in water.

Preferably, the intimate contacting with water is carried out in a scrubbing column. The column is configured, in particular, as a packed column.

Preferably, the water used for further purification of the cycle gas stream obtained downstream of the $CO_2$ absorption step has a purity of ≥98% by weight, particularly ≥99% by weight.

It is advantageous that by using water no new substance (such as, for example, glycols, particularly higher glycols, or an acid, particularly a mineral acid) is introduced into the process. Such new substances could damage, e.g., the EO catalyst.

The temperature of the water used for further purification of the cycle gas stream obtained downstream of the $CO_2$ absorption step, particularly at the entry of the scrubbing column, is preferably in the range from 20 to 50° C., particularly in the range from 25 to 40° C., more particularly in the range from 28 to 35° C.

Preferably, the water used for further purification of the cycle gas stream obtained downstream of the $CO_2$ absorption step is recirculated back to the same purification step (cycle procedure), wherein some of the water is ejected and replaced by fresh water (make-up stream), in order to avoid accumulation of amines (cf. below). Workup of the water occurring in this purification step is preferably omitted.

In a preferred procedure, the ejected water is fed to a wastewater treatment or, particularly advantageously, is used for producing $CO_2$ absorption medium in the preceding process step for $CO_2$ removal.

In a particularly preferred procedure, the part of the ejected water is of a size such that the concentration of amines, particularly high-volatility amines, in particular of N-methyldiethanolamine, piperazine and triethylenediamine in the recirculated water is in the range from 10 to 10 000 ppm by weight, in particular 200 to 2000 ppm by weight, and particularly preferably 400 to 1500 ppm by weight.

It is also appropriate to relate the ejected part of the water to the amount of gas treated, since the amines are introduced into the water scrubber via this gas stream. The ejected amount of water should in this case correspond preferably to 0.1% to 10% of the amount of gas treated, more preferably 0.5% to 5%, particularly preferably 0.8% to 3% (all based on mass). In order to maintain the water balance, water must be fed back to the circuit. This is achieved firstly via the condensed water, since the upstream $CO_2$ absorber is operated hotter than the water scrubber, and secondly by adding fresh water.

Particularly preferably, in the process according to the invention for purifying the cycle gas, a "first contact step" is not carried out in combination with a "second contact step", as described in WO 03/022826 A1 (see above), wherein, in particular, the aqueous liquid is passed from the second contact step to the first contact step.

In the process according to the invention, the absorption medium preferably used is an aqueous solution comprising 10 to 50% by weight, preferably 15 to 25% by weight, of N-methyldiethanolamine [$H_3C$—$N(CH_2CH_2OH)_2$; MDEA] and 1 to 20% by weight, preferably 3 to 8% by weight, of piperazine (PIP).

In a further preferred embodiment, in the process according to the invention, the absorption medium used is an aqueous solution comprising 5 to 40% by weight, preferably 10 to 35% by weight, of triethylenediamine(1,4-ethylenepiperazine; TEDA) and 1 to 15% by weight, preferably 3 to 8% by weight, of piperazine (PIP).

Preferably, the $CO_2$ absorption step is carried out in a $CO_2$-absorber column. Examples of preferred absorber columns are packed columns, packed-bed columns and tray columns.

In an embodiment according to the invention, the scrubbing column is connected directly behind the $CO_2$-absorber column as a separate column which can also be retrofitted in the case of preexisting plants.

In another embodiment, particularly advantageously in the construction of new plants, the scrubbing column is integrated into the column shell of another column such as, e.g. the $CO_2$-absorber column. Since in the case of integration into the $CO_2$-absorber column, the gas volumetric flow rates are identical, the column diameter can also remain the same or approximately the same.

See also FIG. 1.

In a further embodiment, the gas stream, before entry into the $CO_2$-absorber column, is heated via a heat exchanger and the existing gas stream is cooled. Since the cycle gas is taken off from the EO process typically downstream of the cycle gas compressor, it has a temperature greater than 40° C., typically even greater than 50° C., and so the gas stream downstream of the $CO_2$-absorber column cannot be cooled below this value by the heat exchanger. The further cooling and removal of amines can then proceed in the water scrubber.

Figure 2:
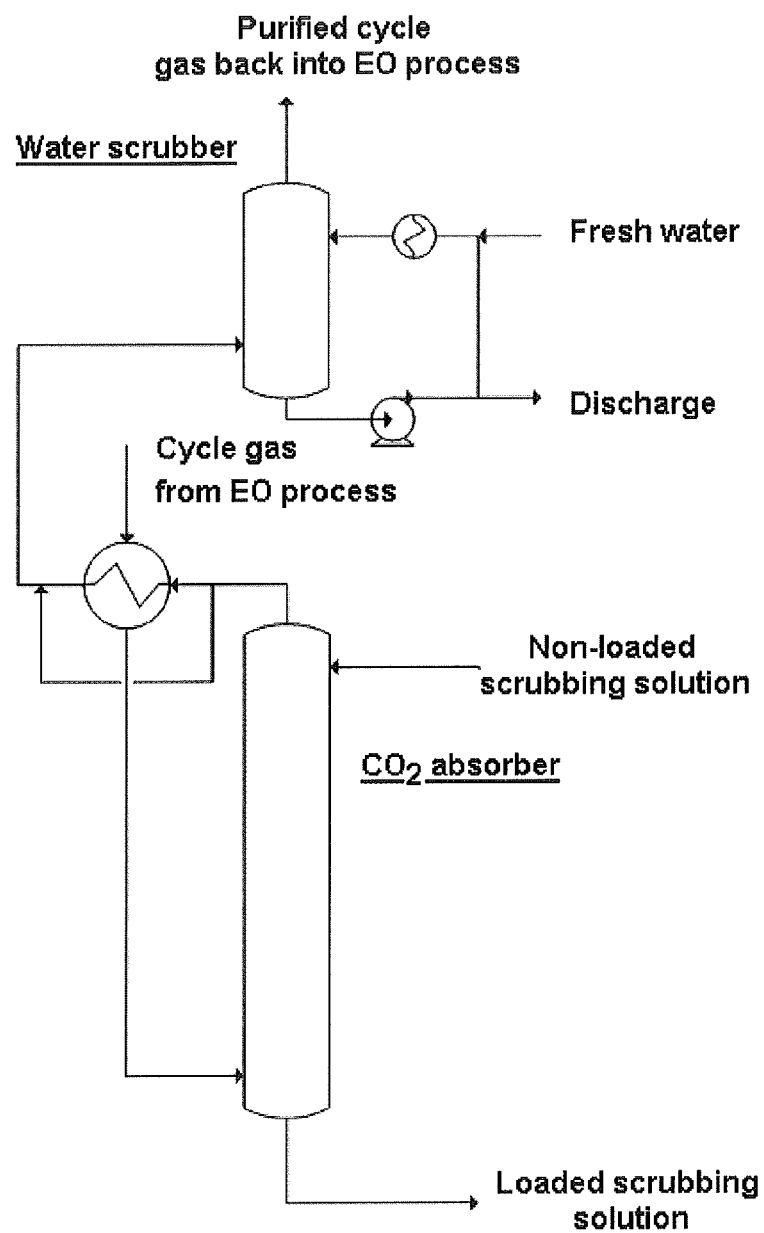
FIG. 2 is a schematic diagram of an embodiment of the process in which the gas stream, before entry into the $CO_2$-absorber column, is heated via a heat exchanger and the existing gas stream is cooled.

See also FIG. 2.

In order to heat the gas stream entering into the $CO_2$-absorber column, in a further embodiment of the invention the scrubbing water heated by means of a heat exchanger can be used.

Figure 3:
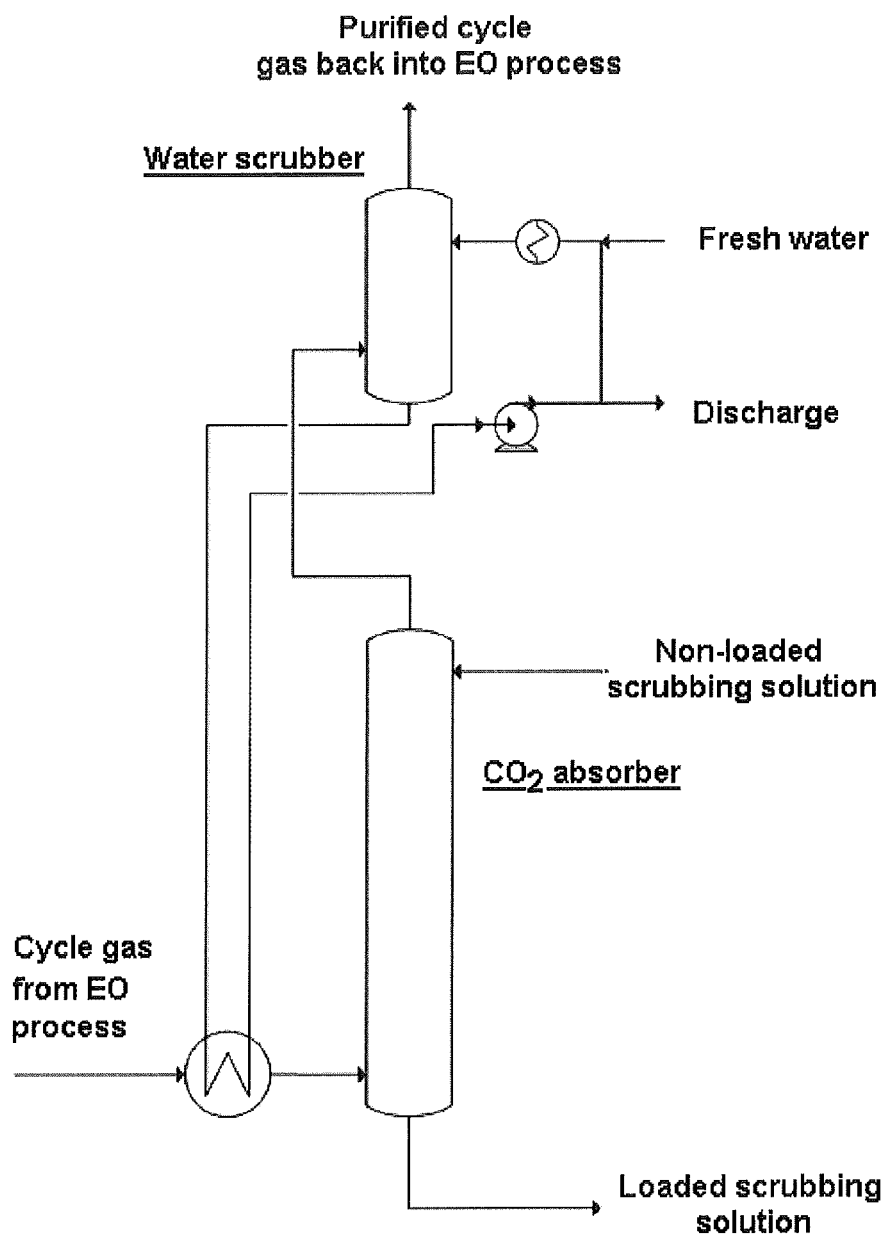
FIG. 3 is a schematic diagram of an embodiment of the process in which the scrubbing water is heated by means of a heat exchanger.

See also FIG. 3.

In order to heat the gas stream entering into the $CO_2$-absorber column, in a further advantageous embodiment of the invention, the warm non-loaded scrubbing solution coming from a stripper (for $CO_2$ removal) can be used. In the exiting gas stream, then, additionally, a further heat exchanger (WT) which is operated with cooling water can be connected. Preferably, however, this is dispensed with and the gas is passed directly into the water scrubber.

Figure 4:
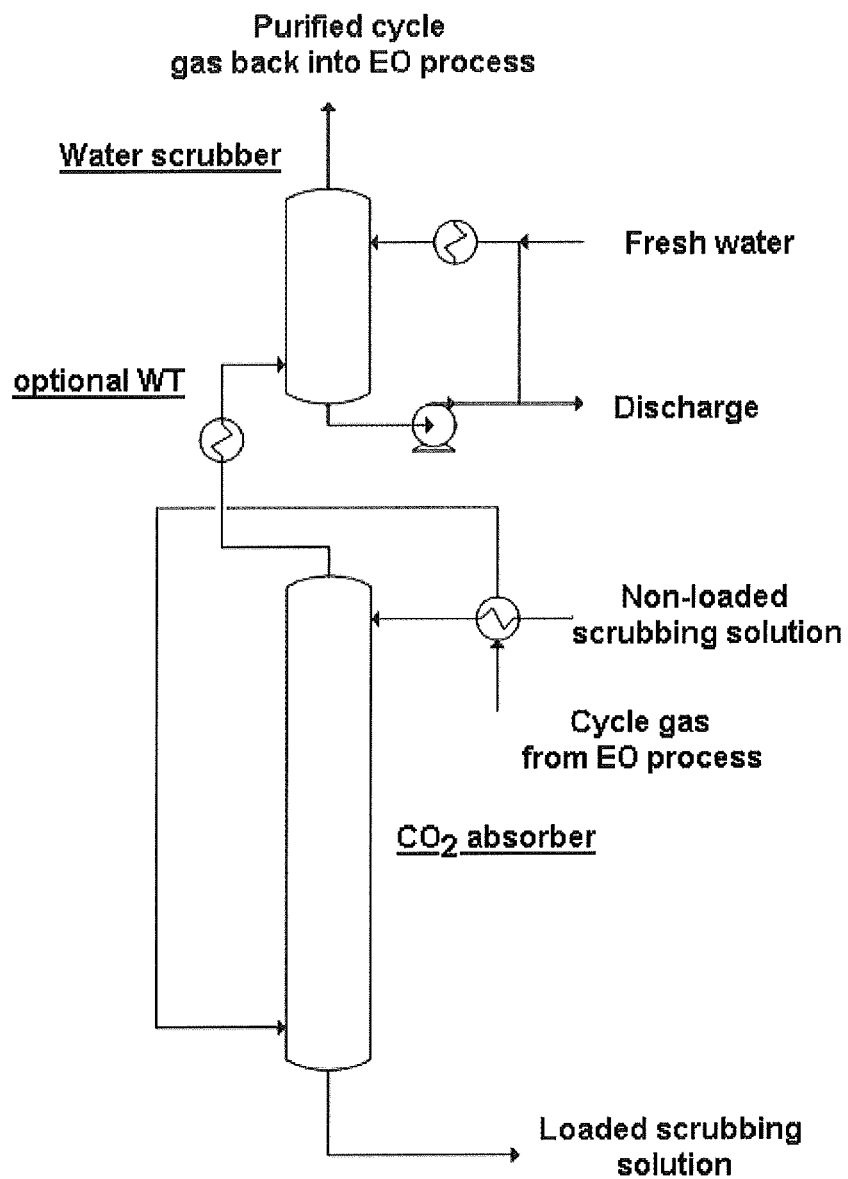
FIG. 4 is a schematic diagram of an embodiment of the process in which the warm non-loaded solution coming from a stripper (for $CO_2$ removal) can be used and a further heat exchanger is connected.

See also FIG. 4.

In a further embodiment, an acid scrubber is connected upstream of the $CO_2$-absorber column, which acid scrubber scrubs ethylene oxide present in traces out of the cycle gas. The scrubbing medium used can be an aqueous solution of an acid, particularly mineral acid, such as, e.g. sulfuric acid or phosphoric acid. The ethylene oxide is catalytically converted by the acid to glycol and so this acidic scrubbing solution can be recirculated with only a low ejection flow rate. The scrubbing in this case proceeds in an apparatus in which gas and liquid are brought into intensive contact. Owing to the thereby reduced content of ethylene oxide, severe degradation of the amine solution (by reaction of the amine with the EO) in the $CO_2$-absorber column is prevented.

Figure 5:
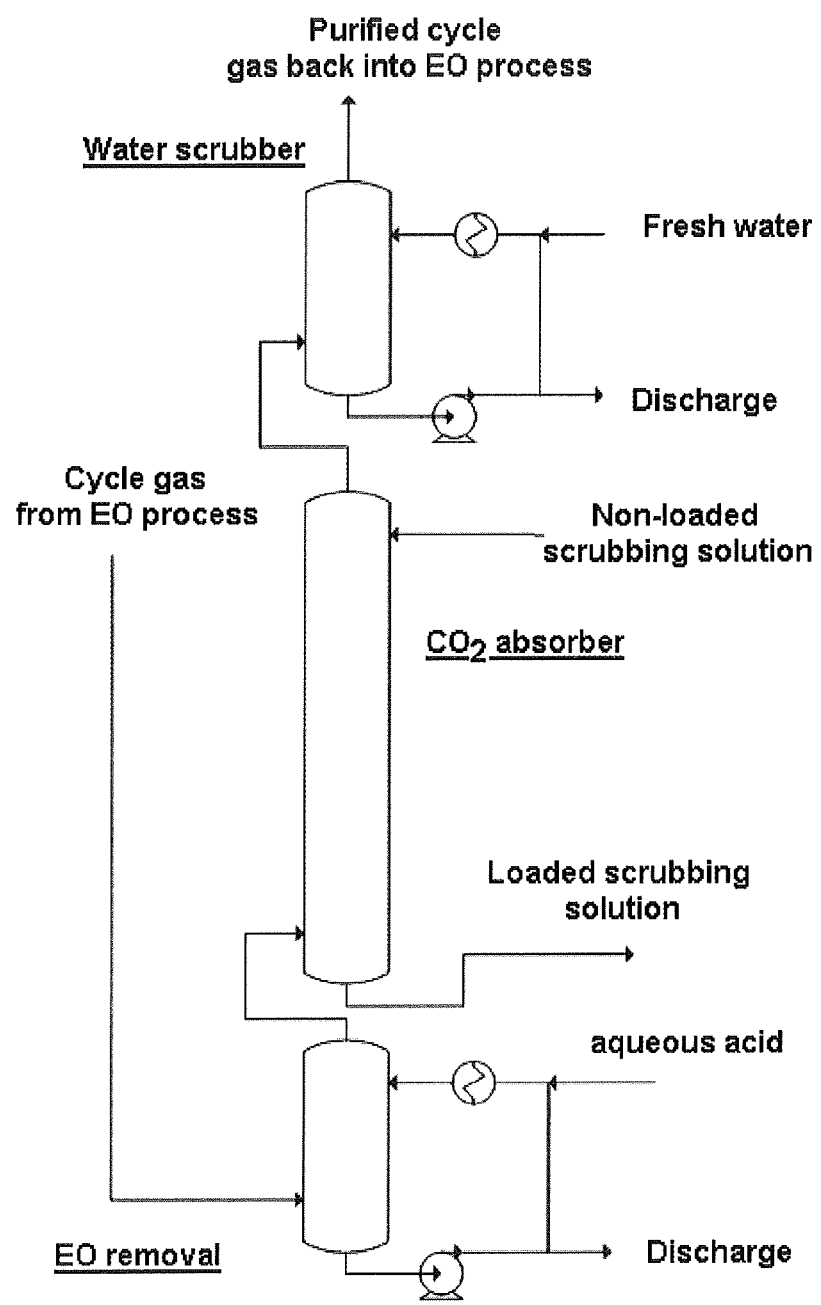
FIG. 5 is a schematic diagram of an embodiment of the process in which an acid scrubber is connected upstream of the $CO_2$ column.

See also FIG. 5.

According to the experimental examples hereinafter, in a pilot plant (cf. also FIG. 6), long-term experiments using amine-comprising solvents (as absorption medium) were performed. In these experiments gas was taken off from an ethylene oxide production process (reaction of $O_2$ with ethylene in the gas phase in the presence of a catalyst, by product $CO_2$) downstream of the removal of the main product (ethylene oxide).

The starting solvent used in the first and second long-term experiments in the scrubbing circuit was a solvent according to WO 03/082844 A1, namely an aqueous solution of 35% by weight of N-methyldiethanolamine (MDEA) and 5% by weight of piperazine (PIP) (see also experiments 1-7). Since principally piperazine (PIP) degraded in the solvent, this was also preferentially replenished. Furthermore, the water content was kept at about 60% by weight, as in the starting solution. The solvent resulting after more than 11 weeks of operating time exhibited concentrations greatly changed from the original solution.

In a third long-term experiment, the starting solvent used was an aqueous solution of 30% by weight triethylenediamine and 5% by weight piperazine (experiment 8). Here also, the water content was kept at the level of the starting solution of approximately 65%. The solvent resulting after more than 13 weeks of operating time likewise exhibited concentrations greatly changed from the original solution.

A water scrubber, constructed as a packed column, was operated downstream of the $CO_2$ absorber. Since the $CO_2$ absorber was operated using a 40% strength amine solution for experiments 1-7 and using a 35% strength amine solution for experiment 8, which amine solution enters the column at 65° C., the clean gas stream comprised relatively large amounts of amines which had to be trapped by the water scrubber.

Via a gas sampler using wash bottles in which was situated acetic gas, the total amine content was able to be determined in the gas which leaves the scrubber. All alkaline components were trapped and it was subsequently possible via nitrogen analysis to find all components which comprise nitrogen. It was possible thereby even to find unknown components which had formed which could possibly have an adverse effect on the catalyst. As a result, the amine content in the gas phase, using as a basis a median molar mass (that of piperazine was used) for the amines, was reduced to 4 vol.-ppm (experiment 1) and by increasing the fresh water feed and reducing the temperature to 1.6 vol.-ppm (experiment 2) and 1.4 vol.-ppm (experiment 3).

The success of the water scrubber was surprising, since owing to the degradation a multiplicity of components forms, the separability of which in a water scrubber is unknown under some circumstances. Owing to the low amount of water ejected, furthermore, components can accumulate in the scrubbing water and thereby increase the amine vapor pressure over the solution. In addition, according to U.S. Pat. No. 3,137,654, ammonia can be formed which, owing to its high volatility, can be separated off only with difficulty in a water scrubber.

Since the packed bed of the pilot plant only had a height of 1.2 m, it may be suspected that the equilibrium concentration in the gas phase had not yet been achieved and therefore, in a large-scale apparatus relatively low amine concentrations may still be expected. In order to detect this, the gas volumetric flow rate was reduced in order to increase the residence time in the column and thereby simulate a relatively large packed bed. A reduction from 50 kg/h to 25 kg/h gave in this case a reduction in the amine concentration from 0.33 vol.-ppm to 0.18 vol.-ppm for experiments 4 and 5. And from 5.6 vol.-ppm to 3.6 vol.-ppm for experiments 6 and 7 which, however, were run at higher temperatures than described according to the invention in order to indicate the mass transport limitation. It may be expected in this case that in a large plant the levels reliably fall below the abovedescribed 1 vol.-ppm for protection of the catalyst.

Therefore, when the scrubbing device according to this invention is used, damage of the catalyst can be prevented. Owing to the large capacities of world-scale EO plants, changes of a few percentage points in selectivity produce a great change in the costs.

All pressure details relate to the absolute pressure.

EXAMPLES

Description and Process Parameters

Figure 6:
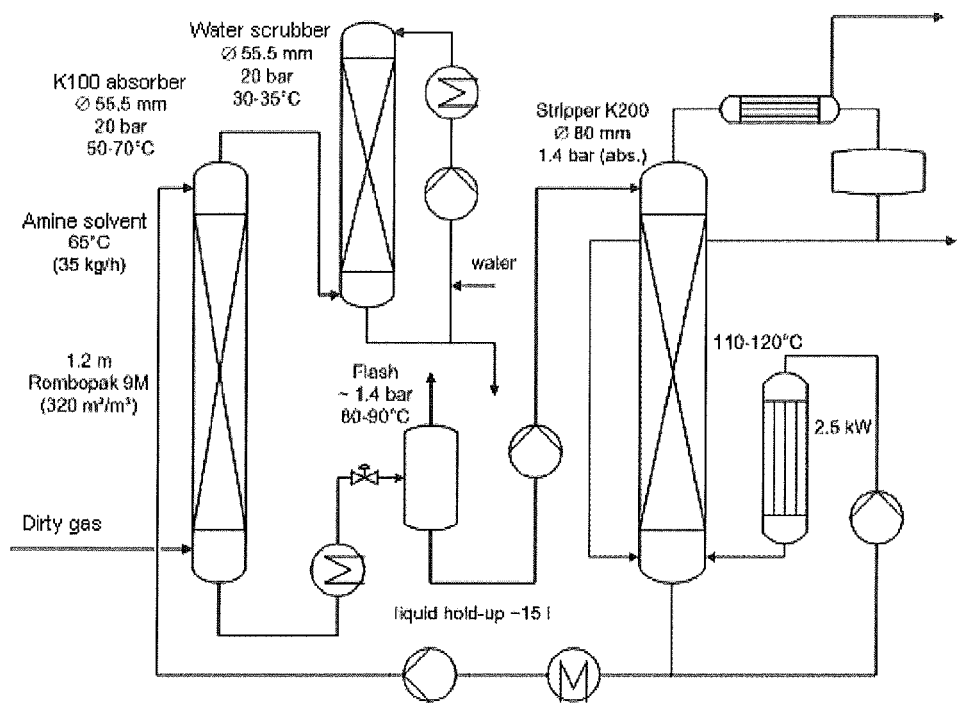
FIG. 6 is a schematic diagram of a pilot plant in which long-term experiments using amine-comprising solvents as absorption medium were performed.

For the experiments, a miniplant system was used which comprises an absorber (K100) having 55.5 mm diameter and 1.2 m bed height, a stripper (K200) having 80 mm diameter and 1.2 m bed height, a water scrubber (K300) having 55.5 mm diameter and 1.2 m bed height and a flash vessel (B100) (FIG. 6). The ordered packings used were a Rombopak 9M. The plant is fully automated in order to keep important process factors constant and was used for long-term experiments in order to test the applicability of the water scrubber for changing solvent compositions as well.

The relevant process parameters are:
Dirty gas feed: 50 kg/h
Dirty gas temperature: 55° C.
Dirty gas concentrations mean values in vol. %:

| $CO_2$ | $C_2H_4$ | $C_2H_6$ | EO | $H_2O$ | Ar | $O_2$ | $N_2$ | $CH_4$ |
|---|---|---|---|---|---|---|---|---|
| 1 | 30 | 0.2 | 5-50 vol.-ppm | 0.2 | 3 | 5 | 1.5 | 58.8 |

Solvent holdup of the entire plant in the amine circuit: 15 l
Circulating solution: 35 kg/h Temperature of solution to the absorber: 65° C.
Temperature of the solution to the flash: 90° C.
Pressure absorber: 18 bar
Pressure flash vessel: 1.45 bar
Pressure stripper: 1.4 bar
Evaporator power: 2.5 kW
Resultant Amine Solutions Three long-term experiments (LV) were run, during these experiments samples were regularly taken at the bottom of the stripper and analyzed using a GC. Therefore, concentrations can be reported for the known and calibrated components. The course of the amine concentrations and the water content was as follows:

| Long-term experiment 1: Starting solution 35% MDEA, 5% piperazine | | | | | | | | | | | | |
|---|---|---|---|---|---|---|---|---|---|---|---|---|
| Running time h | Water g/100 g | MDEA g/100 g | PIP g/100 g | EG g/100 g | MMEA g/100 g | mPIP g/100 g | DEA g/100 g | hem PIP 0 | HEP g/100 g | TEG g/100 g | TEA g/100 g | BHEP g/100 g | BICINE g/100 g |
| 0 | 60.1 | 35.0 | 4.8 | 0.00 | 0.00 | 0.00 | 0.00 | 0.00 | 0.00 | 0.00 | 0.00 | 0.00 | 0.00 |
| 17 | 58.5 | 36.2 | 5.3 | 0.00 | 0.00 | 0.00 | 0.00 | 0.00 | 0.00 | 0.00 | 0.00 | 0.00 | 0.00 |
| 67 | 58.5 | 37.4 | 5.3 | 0.00 | 0.00 | 0.00 | 0.00 | 0.00 | 0.00 | 0.00 | 0.00 | 0.00 | 0.00 |
| 185 | 59.4 | 34.7 | 4.7 | 0.00 | 0.16 | 0.10 | 0.00 | 0.00 | 0.00 | 0.00 | 0.00 | 0.00 | 0.00 |
| 355 | 60.9 | 34.6 | 4.4 | 0.00 | 0.00 | 0.09 | 0.16 | 0.00 | 0.00 | 0.00 | 0.09 | 0.00 | 0.00 |
| 595 | 61.8 | 35.5 | 2.2 | 0.00 | 0.32 | 0.11 | 0.32 | 0.02 | 0.41 | 0.00 | 0.22 | 0.05 | 0.12 |
| 760 | 81.3 | 12.5 | 1.3 | 0.00 | 0.15 | 0.05 | 0.21 | 0.00 | 0.19 | 0.10 | 0.10 | 0.01 | 0.04 |
| 946 | 61.1 | 29.3 | 3.4 | 0.33 | 0.46 | 0.14 | 0.67 | 0.03 | 1.51 | 0.20 | 0.72 | 0.48 | 0.52 |
| 1074 | 61.0 | 30.1 | 2.1 | 0.41 | 0.43 | 0.13 | 0.74 | 0.17 | 1.53 | 0.19 | 1.31 | 0.76 | 0.69 |
| 1180 | 58.5 | 28.8 | 0.9 | 0.43 | 0.45 | 0.15 | 0.80 | 0.25 | 1.83 | 0.19 | 1.47 | 1.02 | 0.88 |
| 1231 | 59.5 | 29.0 | 2.0 | 0.41 | 0.41 | 0.21 | 0.75 | 0.25 | 1.71 | 0.16 | 1.84 | 1.03 | 0.74 |
| 1372 | 60.4 | 28.1 | 0.8 | 0.42 | 0.38 | 0.18 | 0.67 | 0.40 | 1.82 | 0.14 | 2.21 | 1.41 | 0.95 |
| 1511 | 60.4 | 26.2 | 0.4 | 0.52 | 0.32 | 0.13 | 0.93 | 0.61 | 1.81 | 0.15 | 2.93 | 2.16 | 0.97 |
| 1629 | 60.5 | 25.0 | 0.1 | 0.55 | 0.21 | 0.10 | 1.11 | 0.81 | 1.80 | 0.15 | 3.58 | 2.42 | 1.20 |
| 1634 | 59.8 | 24.7 | 0.5 | 0.56 | 0.36 | 0.10 | 0.76 | 0.58 | 1.53 | 0.14 | 3.23 | 2.21 | 1.56 |
| 1798 | 60.9 | 23.9 | 1.7 | 0.50 | 0.44 | 0.25 | 1.14 | 0.82 | 1.78 | 0.14 | 3.77 | 2.32 | 1.49 |
| 1826 | 57.7 | 20.2 | 4.6 | 0.51 | 0.42 | 0.28 | 0.80 | 0.67 | 1.71 | 0.13 | 3.78 | 2.22 | 1.94 |
| 1991 | 57.1 | 18.9 | 3.0 | 0.37 | 0.47 | 0.40 | 1.16 | 0.88 | 2.71 | 0.13 | 4.93 | 2.34 | 1.97 |
| 2133 | 59.2 | 16.3 | 1.9 | 0.51 | 0.53 | 0.37 | 1.49 | 1.11 | 3.08 | 0.13 | 5.56 | 3.28 | 2.11 |
| 2279 | 57.8 | 14.8 | 0.9 | 0.81 | 0.47 | 0.20 | 1.23 | 1.18 | 2.54 | 0.12 | 5.74 | 4.00 | 2.62 |
| 2327 | 54.7 | 14.0 | 3.5 | 0.41 | 0.52 | 0.30 | 1.28 | 1.18 | 2.67 | 0.12 | 5.97 | 3.96 | 2.74 |
| 2495 | 55.4 | 13.2 | 2.8 | 0.35 | 0.48 | 0.27 | 1.69 | 1.30 | 2.90 | 0.12 | 6.82 | 4.15 | 3.30 |
| 2639 | 57.8 | 11.1 | 1.7 | 0.43 | 0.75 | 0.28 | 3.50 | 2.32 | 4.95 | 0.22 | 12.66 | 7.67 | 6.61 |

| Long-term experiment 2: Starting solution 35% MDEA, 5% piperazine | | | | | | | | | | | | |
|---|---|---|---|---|---|---|---|---|---|---|---|---|
| Running time h | Water g/100 g | MDEA g/100 g | PIP g/100 g | EG g/100 g | mPIP g/100 g | DEA g/100 g | hem PIP g/100 g | HEP g/100 g | TEG g/100 g | TEA g/100 g | BHEP g/100 g | BICINE g/100 g |
| 4 | 66.1 | 29.4 | 4.3 | 0.00 | 0.00 | 0.00 | 0.00 | 0.05 | 0.00 | 0.00 | 0.00 | 0.00 |
| 100 | 59.1 | 34.8 | 4.9 | 0.21 | 0.06 | 0.00 | 0.01 | 1.11 | 0.00 | 0.00 | 0.01 | 0.00 |
| 172 | 58.7 | 32.5 | 4.3 | 0.33 | 0.10 | 0.05 | 0.03 | 1.71 | 0.00 | 0.00 | 0.02 | 0.15 |
| 193 | 57.2 | 31.4 | 5.5 | 0.34 | 0.11 | 0.09 | 0.00 | 1.89 | 0.00 | 0.00 | 0.22 | 0.29 |
| 193 | 0.0 | 0.0 | 0.0 | 0.00 | 0.00 | 0.00 | 0.00 | 0.00 | 0.00 | 0.00 | 0.00 | 0.00 |
| 292 | 55.4 | 31.4 | 6.6 | 0.46 | 0.20 | 0.14 | 0.03 | 2.80 | 0.00 | 0.00 | 0.47 | 0.31 |
| 460 | 56.7 | 26.3 | 6.7 | 0.54 | 0.31 | 0.29 | 0.18 | 4.19 | 0.00 | 0.00 | 1.23 | 0.21 |
| 772 | 61.1 | 19.4 | 6.8 | 0.60 | 0.37 | 0.45 | 0.00 | 4.76 | 0.00 | 2.15 | 1.79 | 0.35 |
| 924 | 59.5 | 17.4 | 6.0 | 0.68 | 0.36 | 0.57 | 0.57 | 5.09 | 0.00 | 2.53 | 2.20 | 0.27 |
| 1020 | 60.2 | 16.5 | 5.6 | 0.74 | 0.34 | 0.62 | 0.67 | 5.34 | 0.00 | 2.85 | 2.56 | 0.56 |
| 1164 | 60.6 | 15.1 | 5.4 | 0.75 | 0.31 | 0.66 | 0.75 | 5.31 | 0.00 | 3.13 | 2.77 | 1.12 |
| 1404 | 60.0 | 14.0 | 4.8 | 0.77 | 0.37 | 1.11 | 0.93 | 5.58 | 0.04 | 2.85 | 3.41 | 0.39 |
| 1572 | 59.7 | 12.5 | 4.8 | 0.82 | 0.32 | 1.29 | 0.96 | 5.20 | 0.00 | 2.74 | 3.50 | 0.35 |
| 1668 | 60.4 | 11.9 | 5.2 | 0.90 | 0.30 | 1.48 | 0.98 | 5.23 | 0.00 | 2.69 | 3.42 | 0.55 |
| 1836 | 60.7 | 10.7 | 4.2 | 0.87 | 0.23 | 1.70 | 0.97 | 5.01 | 0.00 | 2.75 | 3.68 | 0.84 |
| 1973 | 62.4 | 9.7 | 4.2 | 1.10 | 0.21 | 1.67 | 1.07 | 5.18 | 0.03 | 3.89 | 4.33 | 2.32 |
| 2117 | 61.3 | 8.2 | 3.9 | 1.00 | 0.17 | 1.79 | 1.15 | 4.51 | 0.01 | 3.25 | 4.31 | 2.25 |
| 2287 | 59.8 | 7.6 | 3.8 | 1.00 | 0.21 | 1.99 | 1.00 | 4.41 | 0.08 | 3.26 | 4.60 | 2.27 |
| 2455 | 60.2 | 6.1 | 4.2 | 1.10 | 0.27 | 1.98 | 1.03 | 4.20 | 0.09 | 3.30 | 4.70 | 2.70 |
| 2623 | 58.4 | 5.6 | 4.2 | 1.15 | 0.32 | 2.27 | 1.09 | 3.98 | 0.11 | 2.88 | 5.04 | 3.00 |
| 2719 | 58.3 | 4.1 | 3.4 | 1.08 | 0.25 | 1.97 | 0.98 | 3.35 | 0.04 | 2.10 | 4.07 | 2.70 |
| 2959 | 58.5 | 3.5 | 4.0 | 1.09 | 0.25 | 1.90 | 0.84 | 3.16 | 0.08 | 1.64 | 3.82 | 2.76 |

Long-term experiment 3: Starting solution 30% triethylenediamine, 5% piperazine

| Running time h | Water g/100 g | TEDA g/100 g | PIP g/100 g | Molar Mass 242 *) g/100 g | Molar Mass 286 *) g/100 g | TEG g/100 g | hemPIP g/100 g | HEP g/100 g | BHEP g/100 g |
|---|---|---|---|---|---|---|---|---|---|
| 90 | 67.0 | 27.4 | 5.0 | 0.00 | 0.00 | 0.00 | 0.00 | 0.00 | 0.00 |
| 115 | 66.7 | 27.6 | 5.1 | 0.00 | 0.00 | 0.00 | 0.00 | 0.00 | 0.00 |
| 259 | 63.0 | 26.6 | 6.9 | 0.64 | 0.20 | 0.00 | 0.00 | 0.75 | 0.21 |
| 374 | 62.3 | 22.6 | 7.3 | 0.97 | 0.25 | 0.06 | 0.34 | 0.70 | 0.77 |
| 501 | 63.3 | 18.5 | 5.7 | 1.26 | 0.36 | 0.04 | 0.31 | 0.62 | 0.59 |
| 669 | 63.2 | 13.7 | 4.7 | 1.89 | 1.04 | 0.00 | 0.00 | 0.87 | 0.34 |
| 846 | 62.5 | 12.3 | 5.5 | 2.42 | 1.27 | 0.00 | 0.00 | 1.29 | 0.47 |
| 1011 | 62.0 | 9.6 | 5.3 | 2.90 | 1.20 | 0.00 | 0.00 | 1.10 | 0.43 |
| 1173 | 66.7 | 8.0 | 5.2 | 2.92 | 1.10 | 0.00 | 0.00 | 1.22 | 0.45 |
| 1225 | 68.1 | 15.1 | 4.6 | 1.60 | 0.51 | 0.00 | 0.00 | 0.57 | 0.14 |
| 1391 | 66.2 | 15.0 | 4.8 | 2.21 | 0.81 | 0.00 | 0.00 | 0.33 | 0.27 |
| 1573 | 67.5 | 12.6 | 4.2 | 2.28 | 0.64 | 0.00 | 0.00 | 0.10 | 0.25 |
| 1600 | 64.0 | 7.4 | 3.0 | 1.44 | 0.56 | 0.00 | 0.00 | 0.36 | 0.37 |
| 1675 | 63.9 | 8.0 | 3.1 | 1.60 | 0.78 | 0.00 | 0.00 | 0.17 | 0.07 |
| 1711 | 67.7 | 14.2 | 5.5 | 1.92 | 0.86 | 0.00 | 0.00 | 0.24 | 0.28 |
| 1772 | 70.4 | 12.9 | 5.1 | 1.60 | 0.50 | 0.00 | 0.00 | 0.53 | 0.23 |
| 1851 | 66.9 | 10.0 | 4.0 | 1.04 | 0.26 | 0.00 | 0.00 | 2.17 | 0.86 |
| 2001 | 67.5 | 9.3 | 3.1 | 1.40 | 0.31 | 0.05 | 0.00 | 2.32 | 0.93 |
| 2140 | 66.2 | 8.6 | 2.9 | 1.90 | 0.65 | 0.07 | 0.00 | 3.33 | 1.73 |
| 2312 | 68.0 | 7.0 | 1.6 | 1.51 | 0.98 | 0.00 | 0.00 | 3.42 | 2.48 |
| 2448 | 66.9 | 6.8 | 1.3 | 1.57 | 0.90 | 0.00 | 0.00 | 3.06 | 2.08 |

*) Component not calibrated in GC, molar mass from GC-MS

EG=monoethylene glycol; TEG=triethylene glycol
MMEA=N-methylmonoethanolamine;
  DEA=diethanolamine; TEA=triethanolamine
mPIP=N-methylpiperazine; hem PIP=N-(2-hydroxyethyl)-N'-methylpiperazine
HEP=N-(2-hydroxyethyl)piperazine; BHEP=N,N'-bis(2-hydroxyethyl)piperazine;
BICINE=N,N'-bis(2-hydroxyethyl)glycine Additional Water Scrubber:

The water scrubber was operated using a circulating liquid flow rate of 40 kg/h. The liquid inlet temperature was generally between 30 and 40° C. and was briefly elevated in experiments 6 and 7 in order to show the mass transport limitation.

| Experiment | Campaign, time point | Dirty gas in kg/h | Water feed in g/h | Temp. [° C.] | Conc. [vol.-ppm] |
|---|---|---|---|---|---|
| 1 | LV. 1, 2133 h | 50 | 500 | 36.7-38.8 | ~4.0 |
| 2 | LV. 1, 2495 h | 50 | 1000 | 32.0-33.9 | ~1.6 |
| 3 | LV. 1, 2639 h | 50 | 1400 | 32.6-34.7 | ~1.4 |
| 4 | LV. 2, 2117 h | 50 | 500 | 33.0 | ~0.33 |
| 5 | LV. 2, 2287 h | 25 | 250 | 31.2 | ~0.18 |
| 6 | LV. 2, 2719 h | 50 | 500 | 68.3 | ~5.6 |
| 7 | LV. 2, 2623 h | 25 | 250 | 68.6 | ~3.6 |
| 8 | LV. 3, 2140 h | 50 | —*) | 30.0 | <0.1 |

*)no water feed, the amine can be ejected via the condensed water

The invention claimed is:

1. A process for removing carbon dioxide ($CO_2$) by means of an absorption medium from a cycle gas system, wherein the $CO_2$ occurs within a process in which, in the gas phase, ethylene is oxidized by oxygen ($O_2$) to ethylene oxide (EO) in the presence of a catalyst, in which, as by product, $CO_2$ is generated, which comprises absorbing $CO_2$ from a cycle gas stream with the absorption medium comprising an aqueous solution of one or more amines, bringing the cycle gas stream into intimate contact with water to which no mineral acid and no higher glycol was added for further purification of the cycle gas stream obtained downstream of the $CO_2$ absorption step, and recirculating the water back to the same purification step (cycle procedure), wherein some of the water is ejected and replaced by fresh water.

2. The process according to claim 1, wherein the intimate contacting with water is carried out in a scrubbing column.

3. The process according to claim 1, further comprising bringing the cycle gas stream obtained downstream of the $CO_2$ absorption step into intimate contact with water having a purity of ≥98% by weight for further purification.

4. The process according to claim 1, wherein the temperature of the water to which no mineral acid and no higher glycol was added is in the range from 20 to 50° C.

5. The process according to claim 1, further comprising feeding the ejected water to a wastewater treatment.

6. The process according to claim 1, wherein a part of the ejected water is of a size such that the concentration of amines in the recirculated water is in the range from 10 to 10 000 ppm by weight.

7. The process according to claim 1, wherein the absorption medium used is an aqueous solution comprising 10 to 50% by weight of N-methyldiethanolamine and 1 to 20% by weight of piperazine.

8. The process according to claim 1, wherein the absorption medium is an aqueous solution comprising 5 to 40% by weight of triethylenediamine and 1 to 15% by weight of piperazine.

9. The process according to claim 1, wherein the $CO_2$ absorption step is carried out in a $CO_2$-absorber column.

10. The process according to claim 9, wherein the scrubbing column is integrated into a column shell of the $CO_2$-absorber column.

11. The process according to claim 9, wherein the cycle gas stream, before entry into the $CO_2$-absorber column, is heated via a heat exchanger and an exiting gas stream is cooled.

12. The process according to claim 9, wherein the scrubbing water heated by means of a heat exchanger is used in order to heat a gas stream entering into the $CO_2$-absorber column.

13. The process according to claim 9, wherein a warm non-loaded scrubbing solution coming from a stripper (for $CO_2$ removal) is used in order to heat the gas stream entering into the $CO_2$-absorber column.

14. The process according to claim 9, wherein an acid scrubber is connected upstream of the $CO_2$-absorber column, which acid scrubber scrubs ethylene oxide present in traces out of the cycle gas.

15. The process according to claim 1, further comprising using the ejected water for producing the absorption medium in the preceding process step for $CO_2$ removal.

* * * * *